(12) United States Patent
Lin et al.

(10) Patent No.: US 10,802,541 B2
(45) Date of Patent: Oct. 13, 2020

(54) FOLDABLE DISPLAY SCREENS

(71) Applicant: KunShan Go-Visionox Opto-Electronics Co., Ltd., Kunshan (CN)

(72) Inventors: Li Lin, Kunshan (CN); Xiuqi Huang, Kunshan (CN); Bo Yuan, Kunshan (CN); Shixing Cai, Kunshan (CN); Kun Hu, Kunshan (CN)

(73) Assignee: KunShan Go-Visionox Opto-Electronics Co., Ltd., Kunshan (CN)

(*) Notice: Subject to any disclaimer, the term of this patent is extended or adjusted under 35 U.S.C. 154(b) by 0 days.

(21) Appl. No.: 16/557,167

(22) Filed: Aug. 30, 2019

(65) Prior Publication Data

US 2019/0384361 A1    Dec. 19, 2019

Related U.S. Application Data

(63) Continuation of application No. PCT/CN2018/088953, filed on May 30, 2018.

(30) Foreign Application Priority Data

Oct. 31, 2017 (CN) .................... 2017 2 1429602 U

(51) Int. Cl.
  *G06F 1/16* (2006.01)
(52) U.S. Cl.
  CPC .................. *G06F 1/1641* (2013.01)
(58) Field of Classification Search
  CPC ......... G06F 2203/04102; G06F 1/1626; G06F 1/1641; G06F 1/1652

USPC ............... 361/679.3, 679.55, 679.56
See application file for complete search history.

(56) References Cited

U.S. PATENT DOCUMENTS

| | | | |
|---|---|---|---|
| 2011/0285607 A1* | 11/2011 | Kim ..................... | G06F 3/041 345/1.3 |
| 2012/0236484 A1* | 9/2012 | Miyake ................. | G06F 1/1616 361/679.01 |
| 2014/0320393 A1* | 10/2014 | Modarres ............. | G06F 3/017 345/156 |
| 2015/0062525 A1* | 3/2015 | Hirakata ............. | G02F 1/133305 349/158 |
| 2016/0048169 A1* | 2/2016 | Yang .................... | G06F 1/1652 361/749 |
| 2018/0138442 A1* | 5/2018 | Kim ..................... | G06F 3/041 |

(Continued)

FOREIGN PATENT DOCUMENTS

| | | |
|---|---|---|
| CN | 102640074 A | 8/2012 |
| CN | 106782088 A | 5/2017 |
| CN | 108074487 A | 5/2018 |

(Continued)

OTHER PUBLICATIONS

PCT Written Opinion dated Aug. 6, 2018 in International Application No. PCT/CN2018/088953.

(Continued)

*Primary Examiner* — Anthony Q Edwards
(74) *Attorney, Agent, or Firm* — Rimon PC

(57) ABSTRACT

A foldable display screen solves the problem of low reliability of foldable display screens in the prior art. The foldable display screen includes a meander line. The foldable display screen includes at least one gap located at an end of the meander line.

12 Claims, 5 Drawing Sheets

(56) References Cited

U.S. PATENT DOCUMENTS

2019/0032380 A1* 1/2019 Wu .......................... E05D 3/02
2020/0089273 A1* 3/2020 Watamura ............. G06F 1/1652

FOREIGN PATENT DOCUMENTS

| CN | 207381016 U | 5/2018 |
| DE | 2539018 A1 | 3/1977 |
| WO | 2017128749 A1 | 8/2017 |

OTHER PUBLICATIONS

PCT International Search Report dated Aug. 6, 2018 in International Application No. PCT/CN2018/088953.

* cited by examiner

FOLDABLE DISPLAY SCREENS

CROSS-REFERENCE TO RELATED APPLICATIONS

This application is a continuation of International Application No. PCT/CN2018/088953 filed on May 30, 2018, which claims priority to Chinese patent application No. 201721429602.4 filed on Oct. 31, 2017. Both applications are incorporated herein by reference in their entireties.

TECHNICAL FIELD

The disclosed exemplary embodiments relate to the technical field of display screens.

BACKGROUND OF THE PRESENT APPLICATION

FIG. 1a shows an expansion state schematic diagram of a foldable display screen in the prior art. As shown in FIG. 1a, the foldable display screen 10 includes a first screen body and a second screen body. A meander line $oo_0$ is located between the first screen body and the second screen body. At its two ends, the meander line $oo_0$ is intersected with the edge line 11 of the foldable display screen 10 to form right angles, respectively, as shown by angle A and angle B in FIG. 1a.

SUMMARY OF THE PRESENT APPLICATION

Exemplary embodiments of the present application provide a foldable screen, which solves the problem of low reliability of foldable display screens.

According to an exemplary embodiment of the present application, a foldable display screen includes: a first screen body; a second screen body; the first screen body and the second screen body being provided with a meander line there between. The foldable display screen includes at least one gap located at an end of the meander line.

In an exemplary embodiment, the foldable display screen comprises a pair of the gaps located at opposite ends of the meander line.

In an exemplary embodiment, each of the at least one gap is symmetric with respect to the meander line.

In an exemplary embodiment, the shape of the at least one gap is regular or irregular.

In an exemplary embodiment, the at least one gap is formed into a V-shape.

In an exemplary embodiment, an edge line of the foldable display screen is smooth at an opening point of the at least one gap.

In an exemplary embodiment, an edge line of the foldable display screen is smoothly connected to the meander line at two ends of the meander line.

In an exemplary embodiment, an edge line of the foldable display screen smoothes excessively at two ends of the meander line.

In an exemplary embodiment, the at least one gap is formed into a cosine curve shape.

In an exemplary embodiment, the at least one gap with the cosine curve shape is symmetrical with respect to the meander line.

In an exemplary embodiment, the depression depth of the at least one gap is 3 to 5 mm.

In an exemplary embodiment, further comprise a circuit unit, the wiring of the circuit unit is suitable for the shape of the at least one gap.

In the foldable display screen provided in the exemplary embodiments of the present application, by preparing gaps at ends of the meander line on the foldable display screen, the place where the two ends of the meander line intersect with the edge line of the foldable screen display is not right angles any longer. When the foldable display screen is assembled with a rectangular equipment frame, the two ends of the meander line will not be right-angle vertices anymore, so that the bearing capacity to external force will be increased, thus reliability of the foldable display screen is improved.

DETAILED DESCRIPTION OF THE EXEMPLARY EMBODIMENTS

To make the objectives, technical means and advantages of the present application clearer, the present application will be further described below in detail with reference to the accompanying drawings.

Figure 1A:
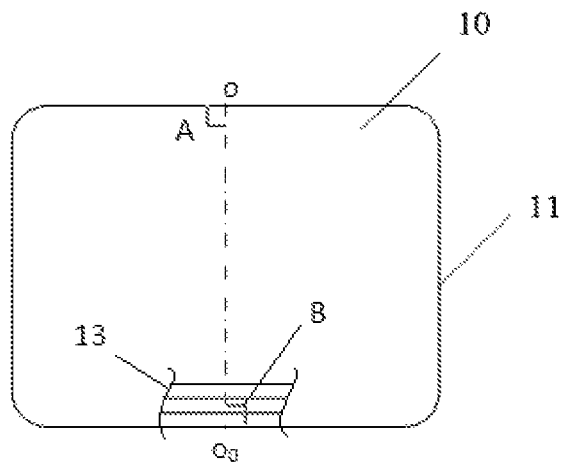
FIG. 1a shows an expansion state schematic diagram of a foldable display screen in the prior art.
Figure 1B:
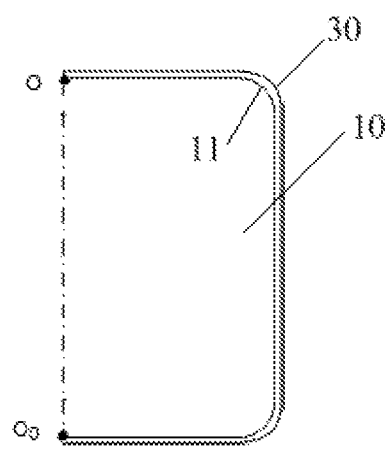
FIG. 1b shows a folding state schematic diagram of the foldable display screen shown in FIG. 1a assembled with an equipment frame.

Referring to FIG. 1b, after the foldable display screen 10 shown in FIG. 1a is assembled with an equipment frame 30 and then folded, the endpoint o and the endpoint $o_0$ of the meander line $oo_0$ will turn to a right-angle vertices respectively (the slight bending deformation during folding will be ignored). As well known, force area of a vertex is small, so that the effect of external force at a vertex is remarkable when the vertex is impacted by the external force.

The foldable display screen 10 generally includes a plurality of staked film layers. The material characteristics of each film layer determine that the foldable display screen 10 is fragile. The friability will be further enlarged due to the right-angle vertices (shown by the point o and point $o_0$ in FIG. 1b) formed during the folding process, so that the reliability of the foldable display screen 10 is reduced.

Figure 2:
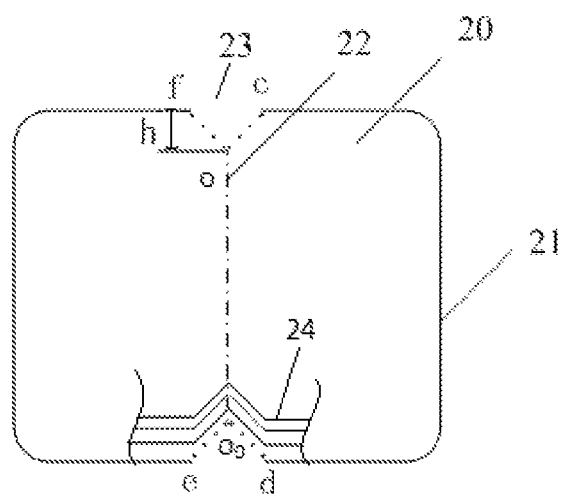
FIG. 2 shows an expansion state schematic diagram of a foldable display screen according to a first exemplary embodiment of the present application.

FIG. 2 shows an expansion state schematic diagram of a foldable display screen according to a first exemplary embodiment of the present application. As shown in FIG. 2, the shape of the foldable display screen 20 is approximately a rectangular, the foldable display screen 20 includes a first screen body and a second screen body. The first screen body and the second screen body are provided with a meander line $oo_0$. The foldable display screen 20 includes a pair of gaps located at opposite ends of the meander line. Opening points of the two gaps 23 on the edge line 21 of the foldable display screen 20 are respectively represented by point c and point f, and point d and point e. In this way, the edge line 21 of the foldable display screen 20 is segmented into six segments, including, an edge line segment oc, an edge line segment cd, an edge line segment $do_0$, an edge line segment $o_0e$, an edge line segment of and an edge line segment fo, which are sequentially connected. The edge line segment oc and the edge line segment fo as well as the edge line segment $o_0e$ and the edge line segment $do_0$ are symmetrical with respect to the meander line $oo_0$, and the edge line segment oc, the edge line segment fo, the edge line segment $o_0e$ and the edge line segment $do_0$ are all straight lines. In this way, the V-shaped gaps 23 shown in FIG. 2 are formed. In an exemplary embodiment, the foldable display screen 20 includes only one gap 23 located at one end of the meander line $oo_0$.

Figure 3:
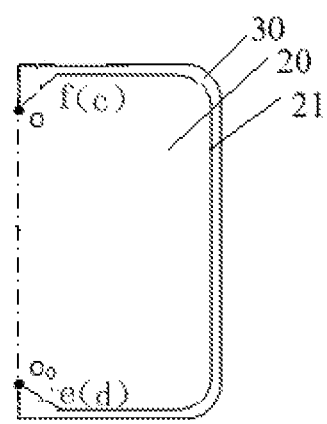
FIG. 3 shows a folding state schematic diagram of the foldable display screen shown in FIG. 2 assembled with an equipment frame.

According to the foldable display screen 20 provided in this exemplary embodiment, due to the presence of the V-shaped gaps 23, the right angles shown by angle A and angle B in FIG. 1a located at intersections of the meander line $oo_0$ and the edge line 21 (specifically includes the edge line segment oc, the edge line segment fo, the edge line segment $o_0e$ and the edge line segment $do_0$) of the foldable display screen 20 turn to obtuse angle $\angle foo_0$ and obtuse angle $\angle do_0c$ shown in FIG. 2. In this way, as shown in FIG. 3, after the foldable display screen 20 shown in FIG. 2 is assembled with an rectangular equipment frame 30 and then folded, two endpoints, including the point o and the point $o_0$, of the meander line $oo_0$ are changed from the right-angle vertices (as shown in FIG. 1b) into obtuse-angle vertices. Thus, to a certain extent, the bearing capacity of the two endpoints to the external force is increased, and the reliability of the foldable display screen 20 is improved.

It should be understood that, referring to FIG. 2, the depression depth h of the V-shaped gaps 23 is larger, the angle values of $\angle foo_0$ and $\angle do_0c$ are larger, the bearing capacity of the point o and the point $o_0$ to the external force after the assembly are higher, and the reliability of the foldable display screen 20 is higher. In an exemplary embodiment, the depression depth h of the V-shaped gaps 23 is 3 to 5 mm. The specific numerical value is rationally selected according to actual situation and will not be limited in the present application.

As shown in FIG. 2, angles, including $\angle cdo_0$, $\angle o_0ef$, $\angle ocd$, $\angle efo$, will be formed at the opening points, including point d, point e, point c and point f of the V-shaped gaps by the V-shaped gaps and the edge line 21 of the foldable display screen 20. In this way, after the foldable display screen 20 is assembled with an equipment frame 30 and then folded, as shown in FIG. 3, these angles correspond to an angular vertex in turn, which includes point d, point e, point c and point f. The bearing capacity of these angular vertices to the external force is an importance factor affecting the reliability of the foldable display screen 20. The angle values corresponding to the angle vertices, including point d, point e, point c and point f are larger, the openings of the V-shaped gaps 23 are larger, i.e., the distance between the point c and the point f (or the distance between the point d and the point e) are larger, and the reliability of the foldable display screen 20 is higher.

Figure 4:
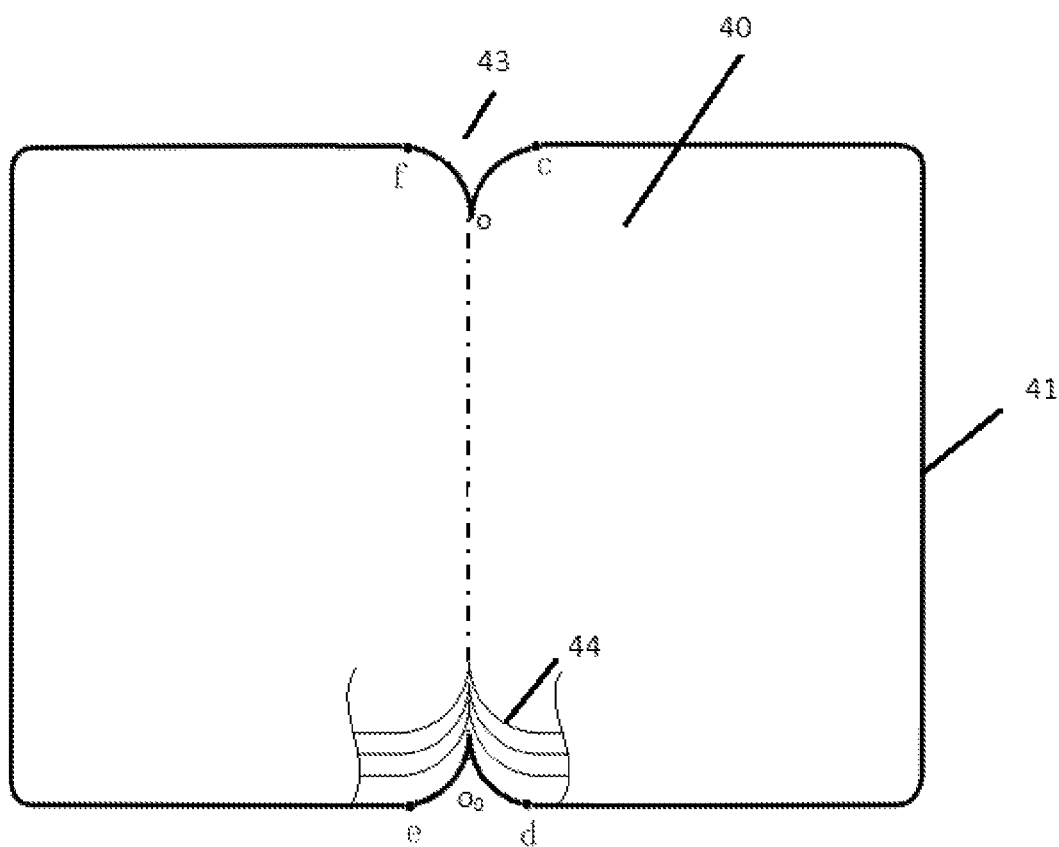
FIG. 4 shows an expansion state schematic structure diagram of a foldable display screen according to a second exemplary embodiment of the present application.

FIG. 4 shows an expansion state schematic structure diagram of a foldable display screen according to a second exemplary embodiment of the present application. As shown in FIG. 4, the difference between the foldable display screen 40 in this exemplary embodiment and the foldable display screen 20 shown in FIG. 2 is the shape of the gaps. Specifically speaking, the edge line 41 of the foldable display screen 40 is smooth at the opening points (including point d, point e, point c and point f) of the gaps 43; and/or, the edge line 41 of the foldable display screen 40 is smoothly connected to the meander line $oo_0$ at two ends of the meander line $oo_0$.

Specifically, the edge line segment oc and the edge line segment $do_0$ of the foldable display screen 40 shown in FIG. 4 are smoothly jointed with the edge line segment cd, respectively; the edge line segment fo and the edge line $o_0e$ are smoothly jointed with the edge line segment ef, respectively; and/or, the edge line segment oc, the edge line segment $do_0$, the edge line segment fo and the edge line segment $o_0e$ are smoothly jointed with the meander line $oo_0$, respectively. In this case, for example, the shape of the gaps may be r-shape, as shown in FIG. 4.

In accordance with the foldable display screen 40 in this implementation, due to the presence of the r-shaped gaps 43, the obtuse angles shown in FIG. 2 at the positions where the edge line segment oc and the edge line segment $do_0$ intersect to the edge line segment cd and the edge line segment fo and the edge line segment $o_0e$ intersect to the edge line segment ef, are changed into arcs shown in FIG. 4; and/or, the obtuse angles shown in FIG. 2 at the positions where the meander line $oo_0$ intersects to the edge line 41 (specifically includes the edge line segment oc, the edge line segment fo, the edge line segment $o_0e$ and the edge line segment $do_0$) of the foldable display screen 40 change into arcs shown in FIG. 4. In this way, as shown in FIG. 5, after the foldable display screen 40 shown in FIG. 4 is assembled with a rectangular equipment frame 30 and then folded, the point d, the point e, the point c and the point f on the edge line 41 become points on the arcs at the corresponding positions; and/or, the two endpoints including point o and point $o_0$ of the meander line $oo_0$ are changed from the obtuse-angle vertices shown in FIG. 3 into the points on the arcs.

Figure 5:
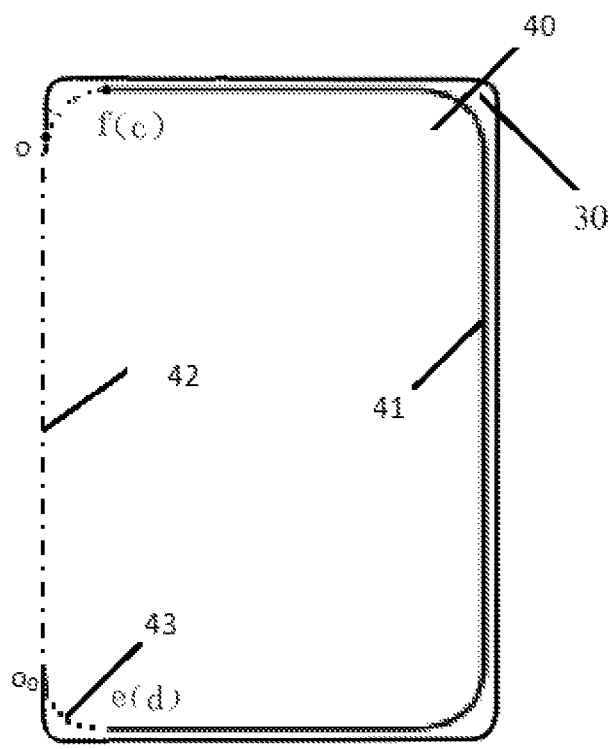
FIG. 5 shows a folding state schematic diagram of the foldable display screen shown in FIG. 4 assembled with an equipment frame.

According to the foldable display screen provided in this exemplary embodiment, due to the presence of the r-shaped gaps, the bearing capacity of the corresponding positions (including the point o, the point $o_0$, the point d, the point e, the point c and the point f shown in FIG. 5) to the external force is further increased compared with the V-shaped gaps shown in FIG. 2 and FIG. 3, and the reliability of the foldable display screen 20 is further improved.

Figure 6:
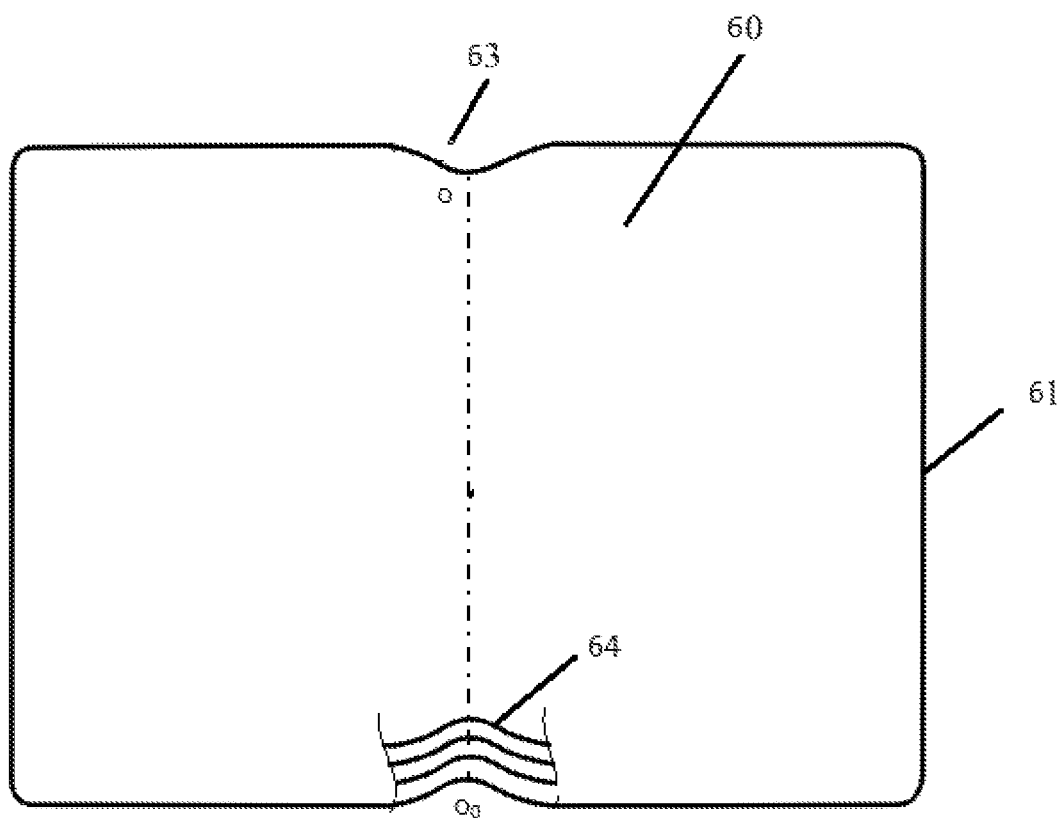
FIG. 6 shows an expansion state schematic structure diagram of a foldable display screen according to a third exemplary embodiment of the present application.

Considering the slight bending deformation will be caused due to a very limited bending radius of the foldable display screen at the meander line $oo_0$ in actual applications, in this case, the meander line $oo_0$ is actually a bent cambered surface. In this case, for the r-shaped gaps 43 shown in FIG. 4, the edge line segment oc and the edge line segment fo, as well as the edge line segment $o_0e$ and the edge line segment $do_0$ will form sharp angles (i.e., $\angle cof$ and $\angle eo_0d$) at two ends of the central axis (i.e., the meander line) of the bent chambered surface, respectively. In this case, the shape of the gaps can be further optimized on the basis of the shape of the gaps shown in FIG. 4. As shown in FIG. 6, the edge line 61 of the foldable display screen 60 smoothes excessively at the two endpoints of the meander line $oo_0$. Specifically, the edge line segment oc and the edge line segment fo are smoothly jointed, the edge line segment $o_0e$ and the edge line segment $do_0$ are smoothly jointed as well. For example, the shape of the gaps is a cosine curve shape using the meander line $oo_0$ as an axis of symmetry, as shown in FIG. 6.

It should be understood by those skilled in the art that the shape and number of gaps in the above exemplary embodiments are merely exemplary. Particularly for the shape of the gap, in practical applications, it is possible to use a combination of the above single shapes to form irregular gaps. Moreover, different gaps in one foldable display screen can be the same or different in shape.

Due to the presence of the gaps, the circuit structure in the foldable display screen according to the present application should also be adjusted correspondingly. Generally, it is only necessary to make the circuit structure avoid the gaps. For example, the circuit structure 13 of the foldable display screen in the prior art shown in FIG. 1 (the circuit structure on one side is schematically shown in FIG. 1a) can be shrunk, at the gaps, toward the inside of the foldable display screen according to the shape of the gaps, to form the circuit structure 24 shown in FIG. 2, the circuit structure 44 shown in FIG. 4 and the circuit structure 64 shown in FIG. 6. These circuit structures given herein are merely exemplary, and it will not be limited in the present application.

In accordance with the foldable display screen provided by the present application, the reliability is improved by forming the gaps. Particularly for the foldable display screen using ultrathin glass, the fragility of the ultrathin glass is overcome to a certain extent.

The foregoing description merely shows the preferred exemplary embodiments of the present application and is not intended to limit the protection scope of the present application. Any modifications, equivalent replacements, improvements and the like made without departing from the spirit and principle of the present application shall fall into the protection scope of the present application.

What is claimed is:

1. A foldable display screen, comprising:
    a first screen body;
    a second screen body;
    the first screen body and the second screen body being provided with a meander line there between, wherein the foldable display screen comprises at least one gap located on at least one of the first and second screen body and at an end of the meander line, wherein the at least one gap creates a space between the first screen body, the second screen body and a frame of the foldable display screen.

2. The foldable display screen according to claim 1, wherein the foldable display screen comprises a pair of the gaps located at opposite ends of the meander line.

3. The foldable display screen according to claim 1, wherein each of the at least one gap is symmetric with respect to the meander line.

4. The foldable display screen according to claim 1, wherein the shape of the at least one gap is regular or irregular.

5. The foldable display screen according to claim 1, wherein the at least one gap is formed into a V-shape.

6. The foldable display screen according to claim 1, wherein an edge line of the foldable display screen is smooth at an opening point of the at least one gap.

7. The foldable display screen according to claim 1, wherein an edge line of the foldable display screen is smoothly connected to the meander line at two ends of the meander line.

8. The foldable display screen according to claim 1, wherein an edge line of the foldable display screen smooths at two ends of the meander line.

9. The foldable display screen according to claim 7, wherein the at least one gap is formed into a cosine curve shape.

10. The foldable display screen according to claim 9, wherein the at least one gap with the cosine curve shape is symmetrical with respect to the meander line.

11. The foldable display screen according to claim 1, wherein the depression depth of the at least one gap is 3 to 5 mm.

12. The foldable display screen according to claim 1, further comprising a circuit unit, the wiring of the circuit unit being suitable for the shape of the at least one gap.

* * * * *